Aug. 13, 1957 E. J. ERIKSEN 2,802,990

SWITCHING SYSTEM IN MULTIPLE LINE MULTIPLEX TRANSMISSION SYSTEM

Filed Aug. 2, 1954 2 Sheets-Sheet 1

Inventor
Erik Jens Eriksen
By Frederick E. Hane
Atty

Aug. 13, 1957 E. J. ERIKSEN 2,802,990

SWITCHING SYSTEM IN MULTIPLE LINE MULTIPLEX TRANSMISSION SYSTEM

Filed Aug. 2, 1954 2 Sheets-Sheet 2

Inventor
Erik Jens Eriksen
By Frederick E. Hane
Atty

United States Patent Office 2,802,990
Patented Aug. 13, 1957

2,802,990

SWITCHING SYSTEM IN MULTIPLE LINE MULTIPLEX TRANSMISSION SYSTEM

Erik Jens Eriksen, Hagersten, Sweden, assignor to Telefonaktiebolaget L M Ericsson, Stockholm, Sweden, a corporation of Sweden Application August 2, 1954, Serial No. 447,233

Claims priority, application Sweden August 4, 1953

4 Claims. (Cl. 333—7)

This invention relates to a connecting device in multiplex transmission systems for the connection of a reserve amplifier, which is common to many transmission lines, said device comprising a connecting relay per line in each repeater included in the system.

If, at some fault in the ordinary amplifier of a line within a multiplex transmission system, it is desirable to connect a reserve amplifier, which is common to two or more lines, over a two state switch in a connecting relay for said reserve amplifier, it appears that the capacitance between the springs of the relay is such as to cause cross-talk between the different lines. This invention relates to a connecting device with common connecting relays for the reserve amplifier, by means of which such a cross-talk is eliminated.

The connecting device according to the invention comprises a connecting relay per line in each repeater, said relay being provided with a number of two state switches, and is substantially characterized by said two state switches being so arranged, that one of the two fixed contacts in one switch is connected to the movable wiper arm of the adjacent switch. Furthermore, in normal position, when the reserve amplifier is not connected to said line, the connection between the switch, which is intended for the reserve amplifier, and the adjacent switch, is not earthed.

Figure 1:
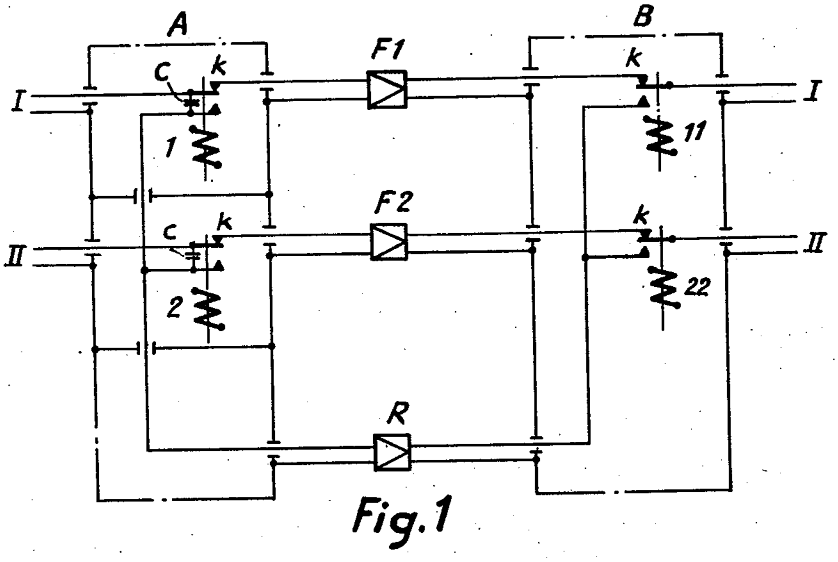
Figure 2:
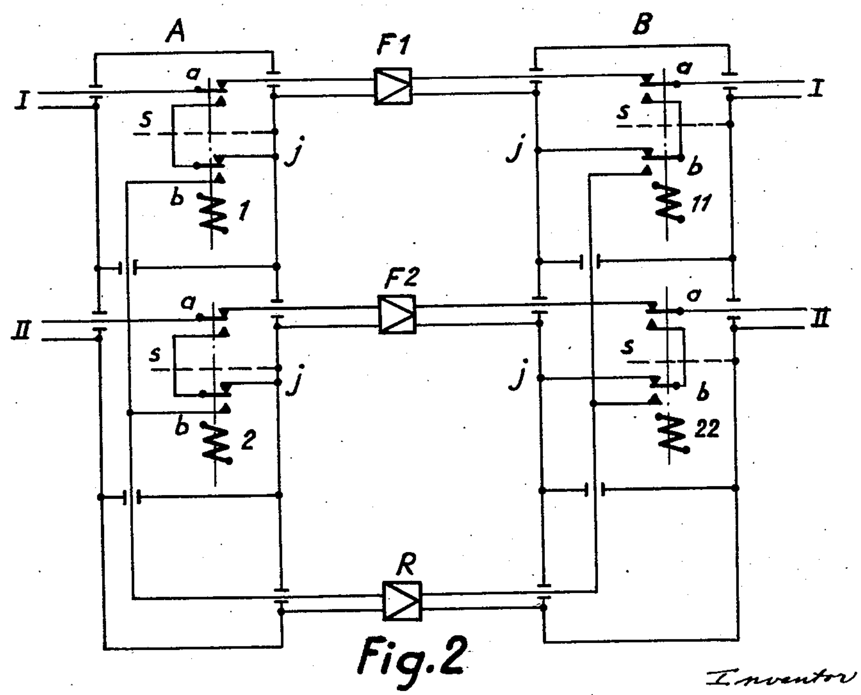
Figure 3:
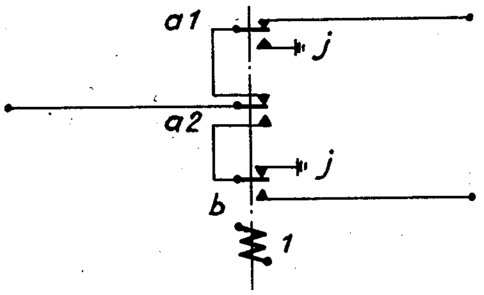

The invention will be more closely described with reference to the accompanying drawing, in which Fig. 1 shows a previously known connecting device. Fig. 2 shows a connecting device for the same purpose in accordance with the invention and Fig. 3 shows a part of a connecting device according to another embodiment of the invention.

In Fig. 1 there are shown schematically two stations A and B within a multiplex transmission system having coaxial tubes and comprising two transmission lines indicated with I and II. Each line is provided with an individual amplifier F1 and F2, respectively, and a common reserve amplifier R is connectable to one of the two lines. For the connection of this reserve amplifier by a fault in some of the ordinary amplifiers F1 and F2, there is arranged in each line and in each station a relay 1, 2, 11, 22 provided with a switch *k*, which in the upper position (the normal position) keeps the respective line connected to the ordinary amplifier but in the lower position of the make-and-break contact connects said line to the reserve amplifier R, when the relay is operated.

It is evident that cross-talk will arise between the two lines I and II at high frequencies between 50 and 5000 C. P. S. by using the simple connecting device shown in Fig. 1, owing to the stray capacitance C between the relay springs, said capacitance being marked in the drawing.

The connecting device shown in Fig. 2, for which as far as possible the same indications have been used as in Fig. 1 for analogous devices, is shaped in accordance with the invention so as to avoid said cross-talk. Normal relays and relay springs may be used for this.

The connecting device differs from the one shown in

Fig. 1 substantially by being provided with two switches *a* and *b* for each of the connecting relays, 1, 2, 11, 22, instead of the switch *k* in Fig. 1. When the relays are in their normal positions shown in Fig. 2, i. e. when the ordinary amplifiers F1, F2 are connected but the reserve amplifier R is disconnected, the connection between the switches *a* and *b* is earthed at *j*, whereby the capacitance between the springs within the single switch is neutralized. A possible capacitance between the two switches *a* and *b* may furthermore easily be eliminated by a screen *s* connected to earth.

In Fig. 3 there is shown an improved embodiment of the connecting device according to the invention. This device, of which only one detail is shown, is completely symmetrical. The most centrally situated switch *a2* corresponds to the one indicated with *k* in Fig. 1, over which said line is connected to its normal amplifier in the upper position of the wiper arm of the switch shown in Fig. 3. This connection with the normal amplifier runs over the wiper arm of the top switch *a1*. In this normal position the wiper arm of the lowest switch *b* is earthed. When the corresponding connecting relay 1 is operated the different wiper arms are transmitted to their lower positions, whereby the uppermost switch *a1* is earthed at *j*, and the wiper arm of the most centrally situated switch *a2* is connected with the switch *b*, which is disconnected from earth and connected to the reserve amplifier not shown.

The invention is not limited to the above details but may be modified in different manners and it appears from the above that the unipolar connections just as well may be multipolar.

I claim:

1. In a multiplex transmission system including several transmission lines, a line amplifying means in each line and common reserve amplifying means, a switching device for disconnecting a fautly line amplifying means from the respective transmission line and connecting the reserve amplifying means to the said line, said switching device comprising a relay means on the input and output side of each line amplifying means, each of said relay means including a pair of two-position switches controlled by the state of energization of the respective relay means, one switch of each pair having a switch terminal connected to the respective transmission line and connectable to either one of two other switch terminals of the said switch, one of said two other switch terminals being connected to the respective line amplifying means and the other to a circuit connection also connected to a switch terminal of the other switch of the said pair, said last mentioned switch terminal being connectable to either one of two other switch terminals of said other switch of the pair, one of said two other switch terminals being grounded and the other switch terminal being connected to said reserve amplifying means, the switches of each pair being biased to connect in one state of energization of the respective relay means, through the respective switch terminals of said one switch, the respective transmission line and the respective line amplifying means and through the respective switch terminals of said other switch said circuit connection to ground, and the switches of each pair connecting in another state of energization of any of the relay means through the respective switch terminals of said one switch of the respective relay means, the respective transmission line to said circuit connection and through the respective switch terminals of said other switch of the respective relay means, said circuit connection to the reserve amplifying means and further simultaneously disconnecting said circuit connection from ground.

2. In a multiplex transmission system including several transmission lines, a line amplifying means in each line and common reserve amplifying means, a switching device for disconnecting a faulty line amplifying means from the respective transmission line and connecting the reserve amplifying means to the said line, said switching device comprising a relay means on the input and output side of each line amplifying means, each of said relay means including a pair of two-position switches controlled by the state of energization of the respective relay means, each of said switches including two stationary contacts and a movable contact arm connectable to either one of said stationary contacts, one switch of each pair having its movable contact arm connected to the respective transmission line, one of its stationary contacts to respective line amplifying means and the other of its stationary contacts to a circuit connection also connected to the movable contact arm of the other switch of said pair, one of the stationary contacts of said other switch being grounded and the other stationary contact being connected to said reserve amplifying means, the switches of each pair being biased to connect in one state of energization of the respective relay means through the movable contact arm and one of the stationary contacts of said one switch the respective transmission line and the respective line amplifying means and through the movable contact arm of said other switch said circuit connection to ground and the switches of each pair connecting in another state of energization of any of the relay means through the movable contact arm of said one switch of the respective relay means the respective transmission line to said circuit connection and through the movable contact arm of said other switch of the respective relay means said circuit connection to the reserve amplifying means and further simultaneously disconnecting said circuit connection from ground.

3. In a multiplex transmission system including several transmission lines, a line amplifying means in each line and common reserve amplifying means, a switching device for disconnecting a faulty line amplifying means from the respective transmission line and connecting the reserve amplifying means to the said line, said switching device comprising a relay means on the input and on the output side of each line amplifying means, each of said relay means including a pair of two-position switches controlled by the state of energization of the respective relay means, a first switch of each of said pairs of switches including two movable contact arms and four stationary contacts, the said switch having one of its stationary contacts connected to the respective line amplifying means and a second stationary contact to ground, one of said movable contact arms being engageable with either one of said two stationary contacts and being connected to a circuit connection also connected to a third contact of said four stationary contacts in said first switch, the other movable contact arm in said first switch being connected to the respective transmission line and engageable with either said third or the fourth contact of said four stationary contacts in the said switch, the second switch of said pair including two stationary contacts and a movable contact arm engageable with either one of said contacts, said fourth contact being connected to a circuit connection also connected to the movable contact arm of said second switch, one of the stationary contacts of said second switch being grounded and the other stationary contact being connected to said reserve amplifying means, said first switch being biased to connect in one state of energization of the respective relay means, through its respective movable contact arm, the respective line amplifying means to said circuit connection in said first switch of the pair and through said other movable contact arm of said first switch to connect the respective transmission line also to said circuit connection in said first switch, and through the movable contact arm of said second switch to connect to ground said other circuit connection connecting said movable contact arm and said fourth contact of said first switch, and said one movable contact arm of said first switch in another state of energization of any of the relay means disconnecting the respective line amplifying means from said circuit connection in said first switch and simultaneously connecting said circuit connection to ground, said other movable contact arm in said first switch disconnecting the respective transmission line from said circuit connection in said first switch and simultaneously connecting the line to the circuit connection connecting said fourth stationary contact of said first switch to the movable contact arm of said second switch and said movable contact arm of said second switch connecting said last mentioned circuit connection to said reserve amplifying means and simultaneously disconnecting said last mentioned circuit connection from ground.

4. A multiplex transmission system according to claim 1, wherein a grounded shield is arranged between said two switches capacitatively shielding one from the other.

References Cited in the file of this patent

UNITED STATES PATENTS

| | | |
|---|---|---|
| 1,792,496 | Hinshaw | Feb. 17, 1931 |
| 2,229,108 | Maggio | Jan. 21, 1941 |